United States Patent
Creeden et al.

(10) Patent No.: US 9,667,021 B2
(45) Date of Patent: May 30, 2017

(54) PHOSPHATE PHOTONIC CRYSTAL FIBER AND CONVERTER FOR EFFICIENT BLUE GENERATION

(71) Applicant: BAE SYSTEMS INFORMATION AND ELECTRONIC SYSTEMS INTEGRATION INC., Nashua, NH (US)

(72) Inventors: Daniel J. Creeden, Nashua, NH (US); Peter A. Ketteridge, Amherst, NH (US); Paul R. Moffitt, Hollis, NH (US); Katherine J. Snell, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 6 days.

(21) Appl. No.: 14/876,085

(22) Filed: Oct. 6, 2015

(65) Prior Publication Data

US 2016/0099539 A1  Apr. 7, 2016

Related U.S. Application Data

(60) Provisional application No. 62/060,876, filed on Oct. 7, 2014.

(51) Int. Cl.
*H01S 3/094* (2006.01)
*H01S 3/00* (2006.01)
*H01S 3/067* (2006.01)
*H01S 3/16* (2006.01)

(52) U.S. Cl.
CPC ........ *H01S 3/0092* (2013.01); *H01S 3/06716* (2013.01); *H01S 3/06741* (2013.01); *H01S 3/06754* (2013.01); *H01S 3/094007* (2013.01); *H01S 3/1611* (2013.01); *H01S 3/1618* (2013.01)

(58) Field of Classification Search
CPC ............ H01S 3/06716; H01S 3/06741; H01S 3/06754; H01S 3/094003; H01S 3/0092
See application file for complete search history.

(56) References Cited

U.S. PATENT DOCUMENTS

| | | | | |
|---|---|---|---|---|
| 6,972,894 B2* | 12/2005 | Bjarklev | ................ | B82Y 20/00 359/332 |
| 7,599,404 B2* | 10/2009 | Salin | ................... | H01S 3/06716 359/341.1 |
| 7,974,318 B2* | 7/2011 | Hirth | ..................... | H01S 3/1083 372/21 |
| 8,073,019 B2* | 12/2011 | Liu | ..................... | H01S 3/06754 359/341.1 |
| 8,373,925 B2 | 2/2013 | Creeden et al. | | |

(Continued)

OTHER PUBLICATIONS http://spiedigitallibrary.org/, Single-frequency ytterbium-doped fiber laser at 976 nm, Proc. of SPIE vol. 8601 86010X-1, Copyright 2013 SPIE, 8 Pages.

(Continued)

*Primary Examiner* — Daniel Petkovsek
(74) *Attorney, Agent, or Firm* — Davis & Bujold, PLLC; Scott J. Asmus

(57) ABSTRACT

In the method for generating blue laser light with high optical and electrical efficiency, wherein the improvement comprises the step of using a phosphate glass photonic crystal fiber rod as a gain medium.

16 Claims, 3 Drawing Sheets

(56) References Cited

U.S. PATENT DOCUMENTS

| | | | | |
|---|---|---|---|---|
| 8,385,699 | B2* | 2/2013 | Liu | G02B 6/02214 |
| | | | | 359/341.1 |
| 8,643,940 | B2* | 2/2014 | Kudlinski | G02F 1/353 |
| | | | | 359/326 |
| 8,717,668 | B1* | 5/2014 | Creeden | H01S 3/06754 |
| | | | | 359/337 |
| 8,731,356 | B2* | 5/2014 | Peyghambarian | C03B 37/0122 |
| | | | | 385/123 |
| 9,112,328 | B2* | 8/2015 | Traynor | H01S 3/1616 |
| 9,362,707 | B2* | 6/2016 | Jiang | H01S 3/06716 |

OTHER PUBLICATIONS http://www.photonics.pl/PLP, Phosphate Yb3+ doped air-cladding photonic crystal fibers for laser applications, published Mar. 31, 2014, 3 Pages, Photonics Letters of Poland, vol. 6 (1), 47-49 (2014).
http://spiedigitallibrary.org/, Yb-doped fiber laser system generating 12 ns, 0.7 mJ pulses at 82 kHz at 977 nm, Proc. of SPIE vol. 7580 758005-1, Copyright 2010 SPIE, 6 Pages.
High average power, high energy fiber laser system : operation at 977 nm and frequency doubling at 488 nm, Copyright 2008 Optical Society of America, 3 Pages.
Extended single-mode photonic crystal fiber lasers, Apr. 3, 2006 / vol. 14, No. 7 / Optics Express 2715, Copyright 2006 OSA, 6 Pages.
94 W 980 nm high brightness Yb-doped fiber laser, Oct. 27, 2008 / vol. 16, No. 22 / Optics Express 17310, Copyright 2008 OSA, 9 Pages.

* cited by examiner

Photonic crystal array

PHOSPHATE PHOTONIC CRYSTAL FIBER AND CONVERTER FOR EFFICIENT BLUE GENERATION

This application claims priority from U.S. Provisional Application Ser. No. 62/060,876 filed Oct. 7, 2014.

FIELD OF THE INVENTION

This invention relates to lasers, and more particularly, to fiber lasers.

BACKGROUND OF THE INVENTION

Typical blue lasers require cascaded nonlinear conversion, which decreases efficiency. They can also employ a single nonlinear mechanism or stage when operating on a short wavelength of Neodymium (Nd) to Ytterbium (Yb). However, suppression of the gain peaks, in the 1-micron spectral region, is difficult and generally requires optical filtering techniques, which limits the overall power and energy which can be achieved. Operating Yb at 975 nm, similar to operating a Nd-doped laser at 911 nm, suffers from parasitic lasing effects and amplified spontaneous emission (ASE) due to the high gain at the 1030 nm and 1064 nm gain peaks, respectively. In order to operate on the shorter wavelength transitions, the losses in the 1-micron region must be suppressed. This can be done with external filtering. However, at high power intensities and inversion levels, the gain in the 1-micron transition can often overcome the losses, thus limiting power scaling on the short wavelength transition.

Silica based Yb-doped fiber lasers have been used to generate efficient 1-micron light. Photonic crystal fibers have enabled energy scaling to >25 mJ level, and have even been used to generate 975 nm light. However, suppression of the 1030 nm peak, in Yb-doped fibers, is challenging. In view of the above drawbacks, there still remains a need for lasers which have increased efficiency.

SUMMARY OF THE INVENTION

Wherefore, it is an object of the present invention to overcome the above mentioned shortcomings and drawbacks associated with the prior art.

In a preferred embodiment, the invention may use a photonic crystal fiber (PCF) structure as a wavelength filter. In addition to the use of the PCF as a wavelength filter, the large mode area of PCF fibers (i.e., large core diameter, small numerical aperture) allows for favorable gain characteristics for short wavelength of operation, effectively reducing the gain at longer wavelengths. This allows for propagation of the 975 nm light in the fiber core, while leaking any 1030 nm light into the cladding, thereby effectively reducing the overlap of the 1030 nm light with the Yb doping and reducing the gain. In addition, the present invention may use, for example, a phosphate glass as the host material for propagation of the 975 nm light. The inventors discovered that phosphate glass has more favorable gain properties, at 975 nm, than compared to silica glass where the emission and absorption cross section are nearly identical. In phosphate glass, the cross sections provide high emission, with lower absorption, thereby enabling efficient lasing at 975 nm, with low laser threshold. In the silica glass, the absorption and emission cross sections are identical, meaning that this is a highly three-level transition with a high threshold. With phosphate glass, on the other hand, the emission cross section is almost two times higher than the absorption cross section. This is still a three-level transition, but the discrepancy between the emission and absorption means that the overall gain is higher, thereby allowing for better optical performance at 975 nm.

The present invention addresses several methods for enhancing the gain at the short wavelength transition, while simultaneously suppressing gain at the 1-micron transitions, thereby allowing for highly efficient operation in the 900-980 nm region. This also allows for power scaling in the 9XX nm (i.e., 900-999 nm) region which, using conventional approaches, has be difficult. The system may use a photonic crystal fiber structure for dispersion engineering and efficiency. This allows for good overlap of the 9XX nm transition with the doped fiber core while, at the same time, suppressing the gain in the 1-micron transition through modal leakage. The PFC structure and the material dispersion may be chosen to allow for single-moded beam propagation in the fiber core, at 975 nm (for a Yb-doped fiber), while suppressing modal confinement in the core for 1030 nm light. This lack of confinement causes the 1030 nm light to leak into the exterior cladding, thereby effectively reducing the gain that any spontaneously generated 1030 nm photon can achieve. The use of a photonic crystal fiber structure allows for very high efficiency due to pump and signal overlap. The PCF structure allows the present invention to achieve a very large core diameter (>100 microns) with a low numerical aperture (NA<0.03). This provides a large mode field with a single-mode beam propagation. The large core diameter allows for high energy scaling and higher nonlinear thresholds, compared to standard step index fibers. However, the low numerical aperture restricts the fiber from bending. The present invention uses this to its advantage to have a bend-loss-induced mode filtering at 1030 nm, further reducing gain at 1030 nm.

The photonic crystal fiber may be a phosphate glass, or some other silicate based glass having a high solubility of rare earth elements. This enables a short gain length to be used (less than 0.25 m in length, for example). The short gain length minimizes losses. The high doping, that can be achieved in phosphate glasses, allows for better pump absorption properties. This is important due to bleaching effects of the resonant pumping. The high doping and the short gain length are important for pulsed lasers, as this increases the nonlinear thresholds in the fiber core, allowing for higher energy and peak-power scaling compared to traditional silica-based fiber rods which can be >1 m in length. Phosphate and silicate glass have inherently higher nonlinear thresholds, further improving peak power scaling. As a result, only a single nonlinear conversion mechanism or stage is required to achieve the blue output having a wavelength of 488 nm, for example. Since the PCF structure can generate 975 nm light directly, only a single second harmonic generator (SHG) mechanism is needed to obtain the desired blue portion of the spectrum. The use of single second harmonic generator mechanism means that the efficiency loss, due to the second harmonic generator, are minimized and this thereby increasing the overall efficiency of the system. According to the present invention, second harmonic generator efficiencies of greater than 50% can be achieved.

By using a phosphate glass photonic crystal fiber rod as a gain medium, it is possible to suppress the Yb gain at 1030 nm and force lasing/amplification at the ~975 nm peak. The frequency doubling of the 975 nm transition allows for a blue light output with greater than 10% electrical-to-optical efficiency, which is almost an order of magnitude more efficient than currently available approaches. By using a phosphate glass (or silicate glass), along with a PFC structure, it is possible to enhance the gain of the laser medium at 975 nm. In addition, using phosphate glass, in a photonic crystal waveguide structure, makes it possible to engineer the dispersion in the waveguide. Such dispersion allows for excellent propagation of the waveguide, particularly at 975+15 nm, within the core of the waveguide structure, but does not allow for 1-micron light to propagate in the core. This means that the waveguide modes are lossy at 1030 nm, thus suppressing its overlap with the doped region, and decreasing the gain, allowing for efficient extraction of 975 nm wavelength (power), rather than 1030 nm wavelength (power). This, in turn, eliminates parasitic losses and can allow for high output power and energy at 975 nm. This 975 nm output can then be doubled, and its wavelength halved, in order to generate the desired blue light, e.g., having a wavelength of 487.5 nm, for example. Due to the waveguide nature of the glass structure as well as the gain filtering, the present invention can achieve greater than 50% optical efficiency with the 975 nm light and greater than 50% efficiency conversion into the desired blue light, thereby significantly improving the overall efficiency of this blue laser in comparison to conventional approaches known in the art.

A further embodiment of the present invention provides such a system in which the dopant is selected from the group consisting of rare earth elements and combinations thereof.

A still further embodiment of the present invention provides such a system wherein the dopant is selected from the group of lanthanide elements consisting of Ytterbium, Neodymium, Erbium, Holmium, Thulium and combinations thereof.

A still yet further embodiment of the present invention provides such a system wherein the photonic crystal fiber structure comprises a phosphate glass photonic crystal rod.

Another embodiment of the present invention provides such a system in which each the phosphate glass photonic crystal rod is no longer than 0.25 m.

Another embodiment of the invention is where the photonic crystal fiber is used in a q-switched oscillator.

Yet another embodiment is where the photonic crystal structure acts as an amplifier.

The present invention relates to a method of generating a blue laser light having desired optical and electrical efficiency, the method comprising: generating an amplifier seed beam via a seed source; generating a pump beam via a pump source; combining the pump beam and the seed beam with one another into a combined beam; propagating the combined beam through a non-silica photonic crystal fiber structure which functions as a gain medium; propagating an output from the photonic crystal fiber structure through a single second harmonic generator and generating the blue laser light; and outputting the blue laser light from the single second harmonic generator for use.

The present invention also relates to a method of generating a light having optical and electrical efficiency, the method comprising: generating a pump beam via a pump source; propagating the pump beam through a non-silica photonic crystal fiber structure which functions as a gain medium; resonating a laser wavelength within the photonic crystal fiber structure which has a longer wavelength than the pump beam; propagating the laser wavelength output from the photonic crystal fiber structure through a single second harmonic generator to generate the light; and outputting the light from the single second harmonic generator.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
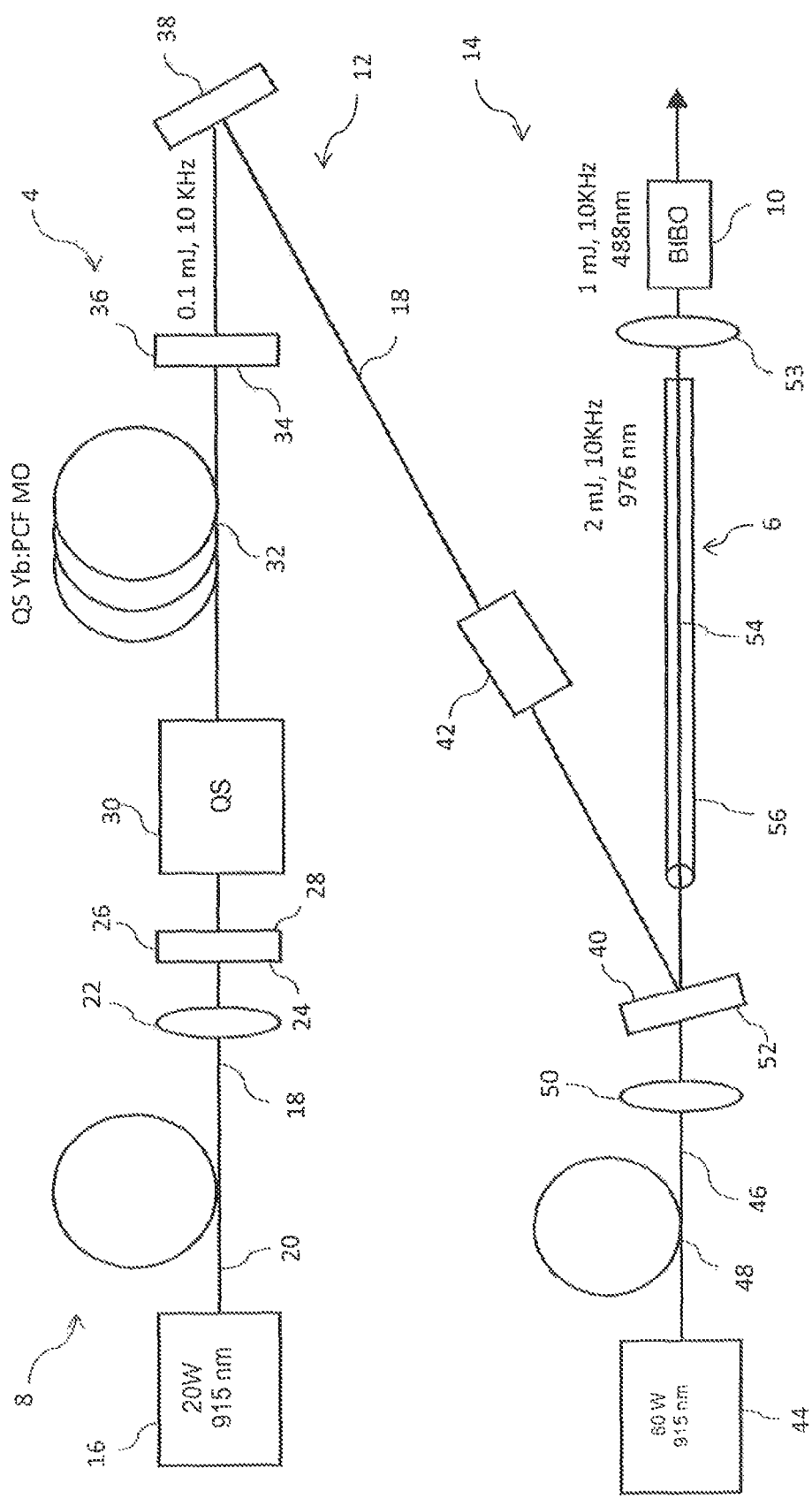
FIG. 1 is a schematic diagram of an oscillator/amplifier setup using the phosphate photonic crystal fiber mode filtering in the amplifier, according to the present invention.

Turning now to FIG. 1, a proposed arrangement, for the practice of the present invention will now be discussed. According to this illustrated embodiment of the invention, the phosphate photonic crystal fiber structure is used both as an oscillator and as an amplifier. The oscillator generates low power 975 nm pulses, while the amplifier boosts the power of those pulses. For both the seed stage 12 and the main stage 14, the fiber is pumped at 915 nm. Due to bleaching concerns, the present invention typically elects use of 915 nm as a pump source. However, it is to be appreciated that the system 8 could also pump at 940 nm, or at a variety of other wavelengths, within the 900-974 nm region for example, without departing from the spirit and scope of the present invention.

A single nonlinear converter 10 is used for converting the 975 nm light to the blue. In this case, about 50% efficiency is achieved. However, the actual efficiency of the nonlinear converter 10 could be either higher or lower depending on characteristics of the laser, such as its pulse duration, its power, its energy, etc. The nonlinear converter 10 may be, for example, a monoclinic bismuth borate or $BiB_3O_6$ (BiBO) nonlinear crystal, a lithium triborate or $LiB_3O_5$(LBO) nonlinear crystal, a $CsLiB_6O_{10}$ (CLBO) nonlinear crystal, or some other suitable nonlinear material.

As generally shown in FIG. 1, the system 8 comprises a seed stage 12 which comprises a first (laser) seed source 16 for generating and supplying a desired amplifier seed beam 18 to the oscillator 4. According to this embodiment, the seed source 16 generates a laser first (laser) amplifier seed beam 18 having a wavelength of 915 nm at a power of 20 W. The generated amplifier seed beam 18 is inputted into a first inlet end of a first optical fiber 20 while the opposite outlet end of the first optical fiber 20 transmits the amplifier seed beam 18 to a seed lens 22. The seed lens 22, in turn, focuses the amplifier seed beam 18 onto a first surface 24 of a high reflector 26, e.g., a partially reflective mirror. The first surface 24 of the high reflector 26 permits substantially all of supplied amplifier seed beam 18 to pass therethrough and enter into the oscillator 4. An opposed second surface 28, of the high reflector 26, is coated with a coating which reflects substantially 100% of the 976 nm back toward an opposite second end of the oscillator 4.

The amplifier seed beam 18 after passing through the high reflector 26 and entering into the oscillator 4, the amplifier seed beam 18 passes through a Q-switch 30 and into a first end of an oscillator optical fiber 32. A second opposite end of the oscillator optical fiber 32 is arranged to emit the amplifier seed beam 18 toward a first surface 34 of an output coupler 36.

The first surface 34 of the output coupler 36 is coated with a reflective coating which typically reflects between 4% and 90% of the 976 nm light back toward the first end of the oscillator 4. Typically, the first surface 34 of the output coupler 36 will reflect between 20% and 80% of the 976 nm light back through the oscillator optical fiber 32 and toward the second surface 28 of the high reflector 26 where the amplifier seed beam 18 is reflected back toward the output coupler 36.

As is conventional within the art, only a portion of the 976 nm light is permitted to pass through the first surface 34 of the output coupler 36 and exit from the oscillator 4 while the remaining portion of the 976 nm light is reflected and repeatedly oscillates back and forth, between the high reflector 26 and the output coupler 36 of the oscillator 4, until such the light is eventually permitted to pass through the first surface 34 of the output coupler 36 and exit from the oscillator 4.

Once the 976 nm light exits from the oscillator 4, substantially 100% of the amplifier seed beam 18 is reflected by a seed mirror 38 toward a main mirror 40, which forms part of a main stage 14. An isolator 42 is located between the seed mirror 38, of the seed stage 12, and the main mirror 40, of the main stage 14, and the isolator 42 is designed to only permit the reflected amplifier seed beam 18, from the seed mirror 38, to propagate in one direction, e.g., from the seed mirror 38 toward the main mirror 40, but not propagate in the opposite direction from the main mirror 40 toward the seed mirror 38.

The main stage 14 of the system 8 is equipped with a second (laser) pump source 44 which, according to this embodiment, also pumps 915 nm light into the system 8. However, the second (laser) pump beam 46, which is pumped by the pump source 44 of the main stage 14, is a 915 nm beam having a higher power level, e.g., a higher power level of 60 Watts in this instance. It is to be appreciated that the power level of the pump source 44 can vary, from application to application, without departing from the spirit and scope of the present invention.

The second pump beam 46 of 915 nm, from the pump source 44, is supplied to a first end of a second optical fiber 48. A second opposite end of the second optical fiber 48 is aligned to supply the second pump beam 46, from the pump source 44, to a first main lens 50 which focuses the second pump beam 46, from the pump source 44 with a wavelength of 915 nm, at a second surface 52 of the main mirror 40. This second surface 52 is not provided with any reflective coating (s) so that substantially all of the supplied second pump beam 46, from the pump source 44 with a wavelength of 915 nm, is permitted to pass therethrough.

The second pump beam 46, from the pump source 44, is then combined with the amplifier seed beam 18 (having a wavelength of 976 nm), from the seed source 16 and supplied by the seed stage 12, and the combined beam 18, 46 propagates toward and enter a first inlet end of an amplifier 6, i.e., a Yb (ytterbium) doped fiber core 54 in this instance. Preferably, the system 8 is designed so that the 976 nm beam travels through the central inner core 54 of the amplifier 6 while the second pump beam 46 (having a wavelength of 915 nm) travels through the exterior cladding 56 of the amplifier 6. As the second pump beam 46, with a wavelength of 915 nm, travels through the exterior cladding 56 of the amplifier 6, the 915 nm beam is reflected by the cladding 56 of the amplifier 6 and eventually passes through the core 54 of the amplifier 6. When the 915 nm beam strikes the ytterbium doping, contained within the core 54, the 915 nm beam excites the electrons contained within the outer shell of the ytterbium to a higher energy level. As this higher energy level eventually decays over time, a photon of 976 nm is emitted during this process. The excitation process, when the 915 nm beam strikes the ytterbium doping contained within the core 54, repeated occurs as the second pump beam 46, with a wavelength of 915 nm, propagates through the cladding 56 of the amplifier 6 and is reflected toward and passes through the core 54. The photons of 976 nm light, generated by the pump source 44 as the 915 nm beam strikes the ytterbium doping contained within the core 54, are combined with the 976 nm light generated by the seed source 16. As a result, the amplifier 6 is able to amplify or increase the amount of 976 nm light which eventually exits and propagates out from the second end of the amplifier 6. The system 8, according to the present invention, is able to increase the amount of 976 nm wavelength light, which is generated by the seed source 16, by typically between 2 and 1000 times and more preferably the system 8 is able to increase amount of the 976 nm light, generated by the seed source 16, by about 20 to about 200 times or so.

As generally shown in this figure, the amplifier 6 is a phosphate glass photonic crystal rod. The phosphate glass photonic crystal rod typically has a length of between 10 and 25 cm and a diameter of between 125 and 600 microns, preferably about 250 microns. However, it is to be appreciated that the overall length and diameter of the phosphate glass photonic crystal rod can vary one embodiment to another, depending upon the particular application at hand.

The amplified 976 nm beam, which eventually exits and propagates from the second end of the amplifier 6, is then transmitted to a second main lens 53 which focuses the 976 nm light a single (BiBO) nonlinear converter 10 which is used to convert the amplified 976 nm light into the desired blue light, e.g., blue light having a wavelength of 488 nm, for example. The blue light, having a wavelength of 488 nm, then exits and propagates away from the second end of the single (BiBO) nonlinear converter 10 and is available for use in a desired application.

Figure 2:
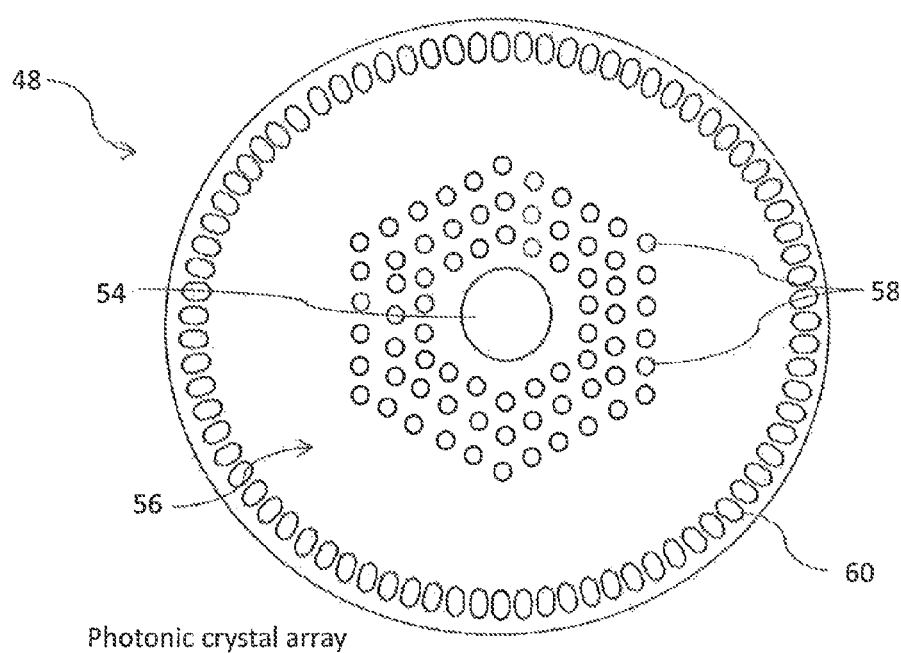
FIG. 2 is a cross-sectional diagram of a phosphate photonic crystal fiber, for use with the present invention.

FIG. 2 diagrammatic illustrates a cross sectional view of the phosphate photonic crystal fiber structure (PPCF). It is to be appreciated that this is diagrammatic cross sectional view of one example of a phosphate photonic crystal fiber structure, for use with the present invention. This figure shows a large fiber core 54, surrounded by air-holes 58 in order to provide the PCF structure. It is to be appreciated that the number, the size and the spacing of the air-holes 58 can vary, from application to application, without departing from the spirit and scope of the present invention. The cladding 56, where the second pump beam 46 is launched, is located outside the PCF structure is and is the material though which the 1030 nm light will generally propagate after leaking from the core 54. This particular design shows an outer air cladding 60 to provide waveguiding to the pump; however, this air cladding 60 may not be necessary. It is possible to have an outer glass cladding 56 with a low index of refraction compared to the pump cladding. This also allows for pump waveguiding and enhances the thermal properties of the fiber, since air is generally a poor conductor of heat.

As generally shown in FIG. 2, the central inner core 54 has a diameter of between 25 and 200 microns, preferably about 100 microns. The cladding 56 is arranged around and surrounds the core 54. The cladding 56 typically has a diameter of between 125 and 600 microns, preferably about 250 microns.

Figure 3:
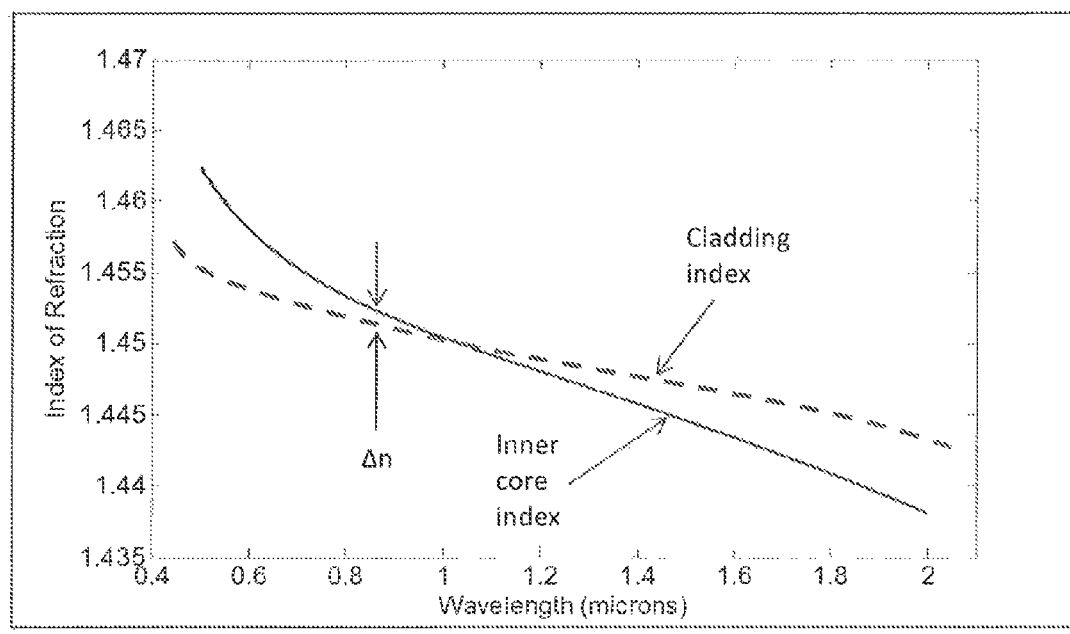
FIG. 3 is a plot of the effective index of refraction of the core and the index of refraction of the cladding, as a function of wavelength.

FIG. 3 is a plot of the effective index of refraction of the core and the index of refraction of the cladding, as a function of wavelength. As shown in this plot, the index of refraction of the cladding (i.e., cladding index) decreases less rapidly than the index of refraction of the core (i.e., inner core index). Since the index of refraction of the core 54 is greater than the index of refraction of the cladding at 975 nm, the core 54 will waveguide the 975 nm light in the core 54 of the fiber. However, since the index of refraction of the cladding 56 is greater than the index of refraction of the core at 1030 nm, the core 54 will not waveguide the 1030 nm light, thus preventing gain overlap at 1030 nm (mode filtering).

Figure 4:
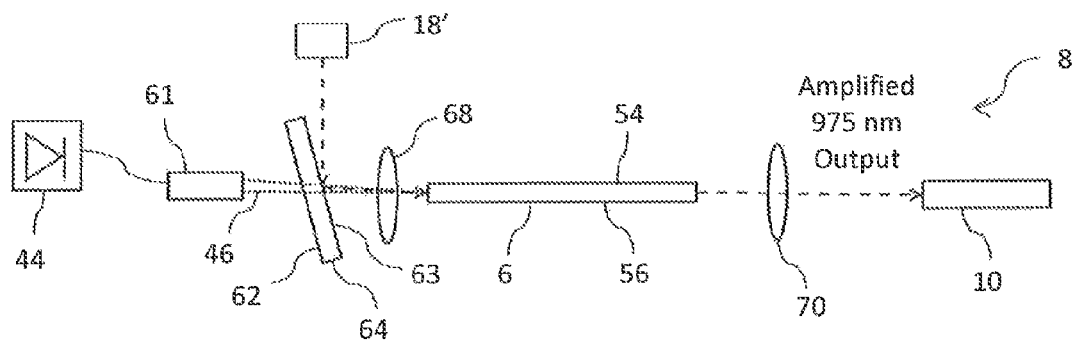
FIG. 4 is a schematic diagram of an amplifier setup using a phosphate crystal fiber mode filtering in the amplifier.

Turning now to FIG. 4, a second embodiment of the present invention will now be described. As this embodiment is very similar to the previously discussed embodiment, only the differences between this new embodiment and the previous embodiment will be discussed in detail while identical elements will be given identical reference numerals.

FIG. 4 shows a simplified embodiment of a phosphate photonic crystal fiber (PPCF) amplifier 6 with a single nonlinear converter 10 and generally includes a pump source 44, a seed source 18' (supplied by a first source—not shown), the PPCF amplifier 6, and the nonlinear converter 10. According to this embodiment, the laser seed beam 18', generated by the first source and having a wavelength of 975 nm, propagates toward and is reflected by a first surface 63 of a seed mirror 64 toward the amplifier 6.

The second (laser) pump source 44, according to this embodiment, pumps 900-950 nm light into the system 8. The second pump beam 46, from the pump source 44 and having a wavelength of 900-950 nm, propagates into a first end of a focusing lens assembly (typically comprising a plurality of lens) 61. A second opposite end of the focusing lens assembly 61 propagates the second pump beam 46, from the pump source 44, toward a second surface 62 and through a seed mirror 64. The combined beam 18', 46 then propagates from the seed mirror 64 toward a first lens 68 which focuses the combined beam 18', 46 at a first inlet end of the amplifier 6, i.e., a Yb (ytterbium) doped fiber core 54 in this instance. Preferably, the system 8 is designed so that the 976 nm seed source travels through the central core 54 of the amplifier 6 while the second pump beam 46 of 900-950 nm travels through the exterior cladding 56 of the amplifier 6. The amplifier 6 operates generally as described above to amplify the 976 nm seed source.

As a result, the amplifier 6 is able to amplify or increase the amount of 976 nm light which eventually exits and propagates out from the second end of the amplifier 6. The system 8, according to the present invention, is able to increase the amount of 976 nm wavelength light, from the seed source, by typically between 2 and 1000 times and more preferably the system 8 is able to increase amount of the 976 nm light by about 20 to about 200 times or so.

The amplified 976 nm beam, which eventually exits and propagates from the second end of the amplifier 6, is then propagated through a second focusing lens 70 and enters into a single nonlinear converter 10 which is used to convert the amplified 976 nm light into the desired blue light, e.g., having a wavelength of 488 nm. The blue light, having a wavelength of 488 nm, then exits and propagates away from the second end of the single nonlinear converter 10 and is available for use in a desired application.

Figure 5:
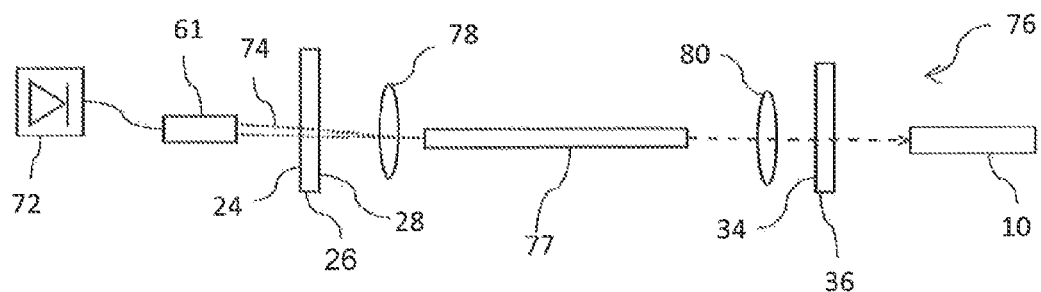
FIG. 5 is a schematic diagram of a continuous wave phosphate photonic crystal fiber oscillator, where the PPCF is the gain medium in the laser cavity.

Turning now to FIG. 5, a third embodiment of the present invention will now be described which is similar to the previously discussed embodiment. In FIG. 5, a simplified embodiment of a phosphate photonic crystal fiber (PPCF) laser oscillator 76, operating as a continuous wave (CW) with single nonlinear converter 10, is shown. According to this embodiment, the pump source 72 generates a laser first (laser) pump beam 74, having a wavelength of 900-950 nm, and propagates the first (laser) pump beam 74 toward a first end of a focusing lens assembly (typically comprising a plurality of lens) 61. A second opposite end of the focusing lens assembly 61 is aligned to propagate the first pump beam 74 toward a first surface 24 of the high reflector 26 which permits substantially all of supplied first pump beam 74 to pass therethrough and enter into the PPCF laser oscillator 76. An opposed second surface 28 of the high reflector 26, is coated with a coating which reflects substantially 100% of the 976 nm back toward an opposite second end of the PPCF laser oscillator 76. A phosphate photonic crystal fiber rod 77 is located between focusing first and second main lens 78, 80. The light which exits from the high reflector 26 propagates through the focusing first main lens 78, the phosphate photonic crystal fiber rod 77 and the second main lens 80 toward a first surface 34 of an output coupler 36.

The first surface 34 of the output coupler 36 is coated with a reflective coating which typically reflects between 4% and 90% of the 976 nm light back toward the first end of the PPCF laser oscillator 76. Typically, the first surface 34 of the output coupler 36 will reflect between 20% and 80% of the 976 nm light back through the second main lens 80, the phosphate photonic crystal fiber rod 77 and the focusing first main lens 78 toward the second surface 28 of the high reflector 26 where the first pump beam 74 is reflected back toward the output coupler 36. This process is repeatedly repeated during operation. The system 8 is designed so that the 976 nm beam travels through the central core 54 of the phosphate photonic crystal fiber rod 77 while the 900-950 nm light travels through the exterior cladding 56 thereof. The PPCF laser oscillator 76 operates, generally as described above, to amplify the 976 nm light.

As a result, the PPCF laser oscillator 76 is able to amplify or increase the amount of 976 nm light which eventually exits and propagates out from the second end thereof. The system 8, according to the present invention, is able to increase the amount of 976 nm wavelength light by typically between 2 and 1000 times, and more preferably the system 8 is able to increase amount of the 976 nm light by about 20 to about 200 times or so.

The amplified 976 nm beam, which eventually exits and propagates PPCF laser oscillator 76 is then transmitted to and enters into a single nonlinear converter 10 which is used to convert the amplified 976 nm light into the desired blue light, e.g., light having a wavelength of 488 nm. The blue light, having a wavelength of 488 nm, then exits and propagates away from the second end of the single nonlinear converter 10 and is available for use in a desired application.

Figure 6:
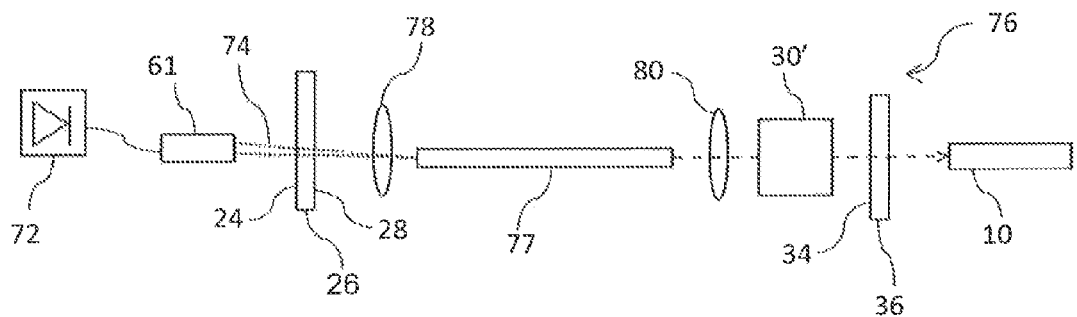
FIG. 6 is a schematic diagram of a q-switched (pulsed) phosphate photonic crystal fiber (PPCF) oscillator, where the PPCF is the gain medium in the laser cavity.

Turning now to FIG. 6, a fourth embodiment of the present invention will now be described which is similar to the previously discussed embodiments. In FIG. 6, a simplified embodiment of a phosphate photonic crystal fiber (PPCF) laser oscillator 76, operating as a Q-switched pulsed source 30' with single nonlinear converter 10, is shown. This embodiment is quite similar to the third embodiment, except that a Q-switch 30' is located between the second main lens 80 and the output coupler 36. As shown, the pump source 72 generates a laser first (laser) pump beam 74, having a wavelength of 900-950 nm, and propagates the first (laser) pump beam 74 toward a first end of a focusing lens assembly (typically comprising a plurality of lens) 61. A second opposite end of the focusing lens assembly 61 is aligned to propagate the first pump beam 74 toward a first surface 24 of the high reflector 26 which permits substantially all of supplied first pump beam 74 to pass therethrough and enter into a first end of a phosphate photonic crystal fiber rod 77. An opposed second surface 28 of the high reflector 26, is coated with a coating which reflects substantially 100% of the 976 nm back toward an opposite second end of the PPCF laser oscillator 76. The phosphate photonic crystal fiber 77 is located between the first and second main lens 78, 80. The light which exits from the high reflector 26 propagates through the first main lens 78, the phosphate photonic crystal fiber rod 77, the second main lens 80 and the Q-switched pulsed source 30' toward a first surface 34 of an output coupler 36. The first surface 34 of the output coupler 36 is coated with a reflective coating which typically reflects between 4% and 90% of the 976 nm light back toward the first end of the PPCF laser oscillator 76. Typically, the first surface 34 of the output coupler 36 will reflect between 20% and 80% of the 976 nm light back through the Q-switched pulsed source 30', the second main lens 80, the phosphate photonic crystal fiber rod 77 and the first main lens 78 toward the second surface 28 of the high reflector 26 of the PPCF laser oscillator 76 where the first pump beam 74 is reflected back toward the output coupler 36 of the PPCF laser oscillator 76.

The Q-switched pulsed source 30' operates in a conventional manner to control the output of the PPCF laser oscillator 76. That is, when the Q-switched pulsed source 30' is "on," the Q-switched pulsed source 30' is misaligned and deflects the beam which prevents the 976 nm beam from exiting the PPCF laser oscillator 76. However, when the Q-switched pulsed source 30' is "off," the Q-switched pulsed source 30' is aligned and permits the 976 nm beam to exit from the PPCF laser oscillator 76.

This process is repeatedly repeated. The system 8 is designed so that the 976 nm beam travels through the central core 54 of the phosphate photonic crystal fiber 77 while the second pump beam 46 of 900-950 nm travels through the exterior cladding 56 thereof. As a result, the PPCF laser oscillator 76 is able to amplify or increase the amount of 976 nm light which eventually exits and propagates out from the second end thereof. The system 8, according to the present invention, is able to increase the amount of 976 nm wavelength light by typically between 2 and 1000 times and more preferably the system 8 is able to increase amount of the 976 nm light by about 20 to about 200 times or so.

The amplified 976 nm beam, which eventually exits and propagates from the PPCF laser oscillator 76 is then propagates toward and enters into a single nonlinear converter 10 which is used to convert the amplified 976 nm light into the desired blue light, e.g., light having a wavelength of 488 nm. The blue light, having a wavelength of 488 nm, then exits and propagates away from the second end of the single nonlinear converter 10 and is available for use in a desired application.

The present invention uses the PCF structure as a wavelength filter. This allows for propagation of the 975 nm light within the fiber core 54 of the photonic crystal fiber structure, while leaking any 1030 nm light into the exterior cladding 56, thereby effectively reducing the overlap of the 1030 nm light with the Yb doping of the inner core 54 and reducing the gain. In addition, the present invention uses a phosphate glass as the host material for propagating the 975 nm light. The inventors have discovered that phosphate, and in particular phosphate glass, has more favorable gain properties at 975 nm, than compared to silica glass where the emission and absorption cross section are nearly identical. In phosphate glass, these cross sections provide high emission, with lower absorption, enabling efficient lasing at 975 nm, with a low laser threshold. In the silica glass, the absorption and emission cross sections are identical, meaning that this is a highly three-level transition with high threshold. On the other hand, the emission cross section for phosphate glass is almost two times higher than the absorption cross section. This is still a three-level transition, but the discrepancy between the emission and absorption means that the overall gain is higher, thereby allowing for better optical performance at 975 nm.

In addition to the gain properties, the phosphate glass can be doped substantially higher, or to a greater degree, with Yb, or some other rare earth element, than compared to silica or silica glass. This means that device or rod length can be on the order of less than 0.25 m, as opposed to ~1 m devices which exist in silica-based PCF rods. This short length promotes compact packaging, low loss, and high nonlinear thresholds. The high doping of the phosphate glass, on the order of more than 4% by wt. for example, also reduces the effects of bleaching due to the required resonant pumping.

By engineering the dispersion, using an appropriate selection of material as well as the PCF structure, the present invention can allow for low loss propagation in the core 54 for 975 nm wavelengths. Similarly, this can be tailored to provide loss at 1030 nm, thereby causing light to leak into the cladding 56. Since the core 54 is doped with Yb, for example, a mode which propagates in the core 54 and is within the gain bandwidth of the Yb ion will see optical gain. If the 1030 nm modal overlap is reduced by leaking that mode into the cladding 56, this means that the overlap between the 1030 nm signal and the gain is reduced, thereby reducing parasitic lasing effects from any 1030 nm amplified spontaneous emission (ASE). The present invention can also use bend-induced wavelength filtering to further enhance this loss mechanism for the 1030 nm wavelengths. This allows the 975 nm light to propagate within the Yb-doped core 54 and experience the optical gain.

To achieve this modal filtering effect via fiber design, the air holes 58 are provided in the PCF structure and such air holes must allow for confinement of the desired wavelengths of interest. This is based on standard, textbook design practices. In addition to the PCF structure, the index of refraction of the various glasses must be appropriately chosen or selected. To achieve the leakage of the 1030 nm light, the index of refraction of the core 54 must decrease more rapidly than the cladding 56 index of refraction, such that $n_{core} > n_{clad}$ for 975 nm and $n_{core} < n_{clad}$ for 1030 nm. This is achieved by different amounts of non-rare-earth doping of the core 54 and the cladding glass. It is to appreciated that the precise amount of doping is highly dependent on the particular application and the exact glass composition, as well as the exact PCF design. Those skilled in the art would be able to determine a suitable amount of doping in order to achieve the features disclosed within this application.

The inventors have discovered that using a phosphate glass also enhances this effect. Phosphate glass has a negative dn/dT, compared to silica which has a positive dn/dT. This means that when a phosphate glass heats up, its index of refraction decreases. When operating as a laser, an amplifier 6 or an oscillator, the core 54 will typically heat up and this, in turn, reduces the index of refraction of the core 54 compared to the index of refraction of the exterior cladding 56. The decrease of the index of refraction of the core 54 relative to the index of refraction of the cladding 56, allowing for active enhanced suppression of the 1030 nm light.

Once 975 or 976 nm light is generated, it can be readily converted to the desired blue light, e.g., having a wave length of 487.5 or 488 nm for example, by subjecting the 975 or 976 nm light to a conventional second harmonic generation (SHG) process or converter 10. This SHG process or converter 10 is performed in a nonlinear material, such BiBO, LBO or CLBO nonlinear crystal. However, due to the short fundamental wavelength at 975 or 976 nm achieved by the present invention, only a single nonlinear converter 10 is required in order to generate blue photons. Other currently available methods and techniques typically require multiple nonlinear converters. In addition, those which are based on solid-state or other fiber configurations, with a single nonlinear converter 10, are limited in output power or pulse energy due to the parasitic lasing of the fundamental 1030 nm (or 1064 nm in the case of Nd doping) gain peak.

Although the above only specifically addresses the ~970-980 nm transition of Yb, it is appreciated that this invention is also applicable to the ~911 nm transition of Nd. In addition, the present invention can also potentially be used with other rare earth dopants to operate off the peak of the gain for that ion system. The exact wavelength of operation will be dependent on the choice of rare earth dopant and host glass composition.

It is to appreciated that the limitations on phosphate glass are its thermal properties. Phosphate glass cannot effectively handle high average powers compared to silica fibers. So the present invention may be limited to pulsed applications at moderate average power levels (less than 100 W), or gain staging will be required to distribute the thermal load.

The fiber is a phosphate glass or other silicate based glass with high rare earth solubility. This enables a short gain length to be used (less than 0.25 m in length) which minimizes losses. In addition, high doping can be achieved in phosphate glasses which allows for better pump absorption properties. This is important due to bleaching effects of the resonant pumping. It is to appreciated that the high doping and short gain length is important for pulsed lasers, as this increases the nonlinear thresholds in the fiber core 54, allowing for higher energy and peak-power scaling compared to traditional silica-based fiber rods which can be >1 m in length. Further phosphate and silicate glass inherently have higher nonlinear thresholds, thereby further improving peak power scaling.

According to the present invention, only a single nonlinear conversion converter 10 is required in order to achieve/obtain a blue light output having the desired wavelength. Since the PCF (phosphate) structure can generate 975 nm light directly, only a single second harmonic generator (SHG) is needed in order to obtain the blue light portion of the spectrum. The use of single SHG mechanism means that the efficiency loss due to the SHG is minimal thereby increasing the overall efficiency of the system 8. The single second harmonic generator achieves efficiencies of greater than 50%.

While the present invention has been described in connection with the preferred embodiments of various figures, it is to be understood that other similar embodiments may be used or modifications or additions may be made to the described embodiment for performing the same function of the present invention without deviating therefrom. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense. Therefore, the present invention should not be limited to any single embodiment, but rather construed in breadth and scope in accordance with the recitation of the appended claims.

What is claimed is:

1. A method of generating a resultant beam of light having desired optical and electrical efficiency, the method comprising:
   generating an amplifier seed beam via a seed source;
   generating a pump beam via a pump source;
   combining the pump beam and the seed beam with one another into a combined beam;
   propagating the combined beam through a non-silica photonic crystal fiber structure, comprising mode-filtering glass and having a core with a first refractive index and a cladding having a second refractive index, wherein the amplifier seed beam is launched into the core of the non-silica photonic crystal fiber structure and the pump beam is pumped into the claddinq of the non-silica photonic crystal fiber structure and the non-silica photonic crystal fiber structure being configured to suppress gain of wavelengths other than seed wavelength;
   propagating an output from the photonic crystal fiber structure through a single second harmonic generator and generating the resultant beam of light; and
   outputting the resultant beam of light from the single second harmonic generator for use.

2. The method according to claim 1, further comprising using a phosphate glass photonic crystal rod as the non-silica photonic crystal fiber structure.

3. The method according to claim 2, further comprising doping the phosphate glass photonic crystal rod with one of Ytterbium (Yb) and Neodymium (Nd).

4. The method according to claim 2, further comprising forming the phosphate glass photonic crystal rod to have a length of between 10 and 25 cm.

5. The method according to claim 1, further comprising generating, via a seed source, a laser having a frequency of between 900-980 nm, and generating, via the pump source, a laser having a frequency of between 900-980 nm.

6. The method according to claim 1, further comprising outputting a blue laser light, as the resultant beam of light from the single second harmonic generator, having a frequency between 450-490nm.

7. The method according to claim 1, further comprising:
supplying the amplifier seed beam, pumped from the seed source, to a seed stage which includes an oscillator;
oscillating the amplifier seed beam within the oscillator;
outputting a portion of the amplifier seed beam from the oscillator; and
combining the amplifier seed beam, outputted from the oscillator, with the pump beam to form the combined beam for amplification using the non-silica photonic crystal fiber structure.

8. The method according to claim 7, further comprising:
using an optical fiber for supplying the amplifier seed beam, pumped, from the seed source, to the seed stage and to focus the amplifier seed beam at an inlet of the oscillator;
oscillating the amplifier seed beam within the oscillator between a high reflector and an output coupler;
reflecting, via a seed mirror, the amplifier seed beam, outputted from the output coupler, to a main mirror; and
combining, via the main mirror, the amplifier seed beam with the pump beam for amplification using the non-silica photonic crystal fiber structure.

9. The method according to claim 8, further comprising locating an isolator, between the seed mirror and the main mirror for only permitting the amplifier seed beam to propagate from the seed mirror toward the main mirror.

10. The method according to claim 9, further comprising generating, via the seed source, a laser having a frequency of between 900-974 nm; and generating, via the pump source, a laser having a frequency of between 900-974 nm.

11. The method according to claim 1, wherein the first refractive index is greater than the second refractive index at about 975 nm, and the second refractive index is greater than the first refractive index at about 1030 nm.

12. A method of generating a blue laser light having optical and electrical efficiency, the method comprising:
generating a pump beam via a pump source;
generating an amplifier seed beam via a seed source;
combining the pump beam with the amplifier seed beam to form a combined beam;
propagating the combined beam through a non-silica photonic crystal fiber structure comprising mode-filtering glass and having a core with a first refractive index and a cladding having a second refractive index, and the non-silica photonic crystal fiber structure being configured to suppress gain of wavelengths other than a seed wavelength wherein the amplifier seed beam is launched into the core of the non-silica photonic crystal fiber structure and the pump beam is pumped into the cladding of the non-silica photonic crystal fiber structure;
propagating an output from the non-silica photonic crystal fiber structure through a single second harmonic generator to generate the blue laser light; and
outputting the blue laser light from the single second harmonic generator.

13. The method according to claim 12, further comprising:
using a phosphate glass photonic crystal rod as the non-silica photonic crystal fiber structure with the non-silica photonic crystal rod having a length of between 10 and 25 cm;
doping the phosphate glass photonic crystal rod with one of Neodymium (Nd) to Ytterbium (Yb);
supplying the amplifier seed beam, pumped from the seed source, to a seed stage including an oscillator;
oscillating the amplifier seed beam within the oscillator;
outputting a portion of the amplifier seed beam from the oscillator; and
combining the amplifier seed beam, outputted from the oscillator, with the pump beam for amplification using the non-silica photonic crystal fiber structure.

14. The method according to claim 13, further comprising:
using an optical fiber for supplying the amplifier seed beam, pumped from the seed source, to the seed stage and to focus the amplifier seed beam at an inlet of the oscillator;
oscillating the amplifier seed beam within the oscillator between a high reflector and an output coupler;
reflecting, via a seed mirror, the amplifier seed beam, outputted from the output coupler, to a main mirror; and
combining, via the main mirror, the amplifier seed beam with the pump beam to from the combined beam for amplification using the non-silica photonic crystal fiber structure.

15. The method according to claim 14, further comprising locating an isolator, between the seed mirror and the main mirror for only permitting the amplifier seed beam to propagate from the seed mirror toward the main mirror; and
generating, via the pump source, a laser having a frequency of between 900-974 nm and a first power and generating, via the seed source, a laser having a frequency of between 900-974 nm and a second power with the second power being greater than the first power.

16. The method according to claim 12, wherein the first refractive index is greater than the second refractive index at about 975 nm, and the second refractive index is greater than the first refractive index at about 1030 nm.

* * * * *